(12) United States Patent
Shu

(10) Patent No.: US 9,996,061 B2
(45) Date of Patent: Jun. 12, 2018

(54) TECHNIQUES FOR SAVING BUILDING ENERGY CONSUMPTION

(71) Applicant: International Business Machines Corporation, Armonk, NY (US)

(72) Inventor: Fang Rui Shu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 809 days.

(21) Appl. No.: 14/013,208

(22) Filed: Aug. 29, 2013

(65) Prior Publication Data
US 2014/0067145 A1 Mar. 6, 2014

(30) Foreign Application Priority Data
Aug. 31, 2012 (CN) .......................... 2012 1 0320840

(51) Int. Cl.
G05B 13/02 (2006.01)
G05B 15/02 (2006.01)

(52) U.S. Cl.
CPC ............. *G05B 13/02* (2013.01); *G05B 15/02* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 6,457,132 B1 | 9/2002 | Borgendale et al. | |
| 8,024,073 B2 | 9/2011 | Imes et al. | |
| 8,244,405 B2 * | 8/2012 | Kao | G05B 15/02 361/42 |
| 8,918,221 B2 * | 12/2014 | Le Roux | G06Q 50/06 700/22 |
| 9,429,927 B2 * | 8/2016 | Nesler | G01R 21/133 |
| 2003/0023540 A2 * | 1/2003 | Johnson | G06Q 10/04 705/37 |

(Continued)

FOREIGN PATENT DOCUMENTS

| | | |
|---|---|---|
| CN | 101821696 A | 9/2010 |
| CN | 102346445 A | 2/2012 |
| CN | 102403790 A | 4/2012 |

OTHER PUBLICATIONS

Cavallaro et al., "ICT4E2B Forum—Deliverable D1.1: Classified Resaerch Areas," Oct. 2010, 42 pages.

(Continued)

*Primary Examiner* — Mohammad Ali
*Assistant Examiner* — Kelvin Booker
(74) *Attorney, Agent, or Firm* — Cantor Colburn LLP

(57) ABSTRACT

According to one aspect of the present invention, a method and system for reducing building energy consumption is provided. The method is provided for saving building energy consumption by obtaining at least one energy use strategy in association with a current or future activity in a building. The method includes aggregating activity data from at least one system associated with the current or future activity and estimating an energy demand level based at least on the aggregated activity data. The method also includes generating at least one energy use strategy based at least on the estimated energy demand.

14 Claims, 13 Drawing Sheets

(56) References Cited

U.S. PATENT DOCUMENTS

| | | | | |
|---|---|---|---|---|
| 2003/0171851 A1* | 9/2003 | Brickfield | H02J 3/008 | 700/286 |
| 2003/0211697 A1 | 11/2003 | Hsu et al. | | |
| 2003/0216971 A1* | 11/2003 | Sick | G06Q 10/0637 | 705/7.36 |
| 2003/0234725 A1 | 12/2003 | Lemelson et al. | | |
| 2006/0155423 A1* | 7/2006 | Budike, Jr. | G06Q 10/06 | 700/286 |
| 2006/0276938 A1* | 12/2006 | Miller | G06Q 50/06 | 700/295 |
| 2008/0046387 A1* | 2/2008 | Gopal | G06Q 10/00 | 705/412 |
| 2008/0167756 A1* | 7/2008 | Golden | G05B 15/02 | 700/297 |
| 2008/0172312 A1* | 7/2008 | Synesiou | G06Q 10/00 | 705/34 |
| 2008/0262990 A1* | 10/2008 | Kapoor | G06F 9/505 | 706/20 |
| 2008/0262991 A1* | 10/2008 | Kapoor | G06F 21/55 | 706/20 |
| 2009/0204267 A1* | 8/2009 | Sustaeta | G06Q 10/04 | 700/291 |
| 2009/0281674 A1* | 11/2009 | Taft | G01D 4/002 | 700/286 |
| 2010/0070217 A1* | 3/2010 | Shimada | G01D 4/008 | 702/62 |
| 2010/0076835 A1* | 3/2010 | Silverman | G06Q 10/06 | 705/14.33 |
| 2010/0138363 A1* | 6/2010 | Batterberry | G06Q 10/04 | 705/412 |
| 2010/0179704 A1* | 7/2010 | Ozog | G06Q 10/06315 | 700/291 |
| 2010/0259931 A1* | 10/2010 | Chemel | F21V 17/02 | 362/249.02 |
| 2010/0262313 A1* | 10/2010 | Chambers | G06Q 10/04 | 700/295 |
| 2010/0286937 A1* | 11/2010 | Hedley | G06Q 30/02 | 702/60 |
| 2010/0295482 A1* | 11/2010 | Chemel | H05B 37/029 | 315/312 |
| 2010/0301774 A1* | 12/2010 | Chemel | H05B 37/029 | 315/297 |
| 2010/0324962 A1* | 12/2010 | Nesler | G06Q 10/0637 | 705/7.36 |
| 2011/0001436 A1* | 1/2011 | Chemel | H05B 37/029 | 315/291 |
| 2011/0001438 A1* | 1/2011 | Chemel | H05B 37/029 | 315/297 |
| 2011/0004446 A1* | 1/2011 | Dorn | G01D 4/002 | 702/188 |
| 2011/0022242 A1 | 1/2011 | Bukhin et al. | | |
| 2011/0047418 A1* | 2/2011 | Drees | G05B 15/02 | 714/57 |
| 2011/0054642 A1* | 3/2011 | Bondar | G05B 15/02 | 700/29 |
| 2011/0061015 A1 | 3/2011 | Drees et al. | | |
| 2011/0178977 A1* | 7/2011 | Drees | G05B 15/02 | 706/52 |
| 2011/0208366 A1* | 8/2011 | Taft | H04L 29/08846 | 700/295 |
| 2011/0213739 A1* | 9/2011 | Benitez | G06Q 10/04 | 706/12 |
| 2011/0219035 A1* | 9/2011 | Korsunsky | G06F 17/30 | 707/784 |
| 2011/0231028 A1* | 9/2011 | Ozog | G06Q 10/06 | 700/291 |
| 2011/0231320 A1* | 9/2011 | Irving | G06Q 30/00 | 705/80 |
| 2011/0231510 A1* | 9/2011 | Korsunsky | G06F 21/55 | 709/213 |
| 2011/0264477 A1 | 10/2011 | Delany et al. | | |
| 2011/0288692 A1* | 11/2011 | Scott | G06F 21/55 | 700/297 |
| 2011/0290893 A1* | 12/2011 | Steinberg | H04Q 9/00 | 236/49.3 |
| 2012/0022700 A1* | 1/2012 | Drees | G06Q 30/0283 | 700/276 |
| 2012/0029710 A1* | 2/2012 | Dodderi | H02J 13/0079 | 700/286 |
| 2012/0046859 A1* | 2/2012 | Imes | H02J 3/14 | 701/409 |
| 2012/0053740 A1* | 3/2012 | Venkatakrishnan | G06Q 50/06 | 700/291 |
| 2012/0065802 A1* | 3/2012 | Seeber | G06F 1/3203 | 700/295 |
| 2012/0131271 A1 | 5/2012 | Delorme et al. | | |
| 2012/0235579 A1* | 9/2012 | Chemel | F21S 2/005 | 315/152 |
| 2012/0240185 A1* | 9/2012 | Kapoor | H04L 63/1425 | 726/1 |
| 2012/0259583 A1* | 10/2012 | Noboa | G05B 15/02 | 702/179 |
| 2012/0290230 A1* | 11/2012 | Berges Gonzalez | G01D 4/004 | 702/61 |
| 2012/0310416 A1* | 12/2012 | Tepper | G05B 15/00 | 700/276 |
| 2013/0085616 A1* | 4/2013 | Wenzel | G05F 1/66 | 700/278 |
| 2013/0134962 A1* | 5/2013 | Kamel | G06Q 50/06 | 324/103 R |
| 2013/0144451 A1* | 6/2013 | Kumar | G05B 13/02 | 700/291 |
| 2013/0231790 A1* | 9/2013 | Shao | G06Q 10/10 | 700/291 |
| 2013/0232151 A1* | 9/2013 | Shao | G06F 17/50 | 707/741 |
| 2013/0262197 A1* | 10/2013 | Kaulgud | G05B 13/02 | 705/14.1 |
| 2014/0245071 A1* | 8/2014 | Drees | G06F 11/079 | 714/39 |
| 2017/0344044 A1* | 11/2017 | Imes | H04L 67/42 | |

OTHER PUBLICATIONS

Wikipedia.org article, "Anonymity", accessed Aug. 23, 2013, http://en.wikipedia.org/wiki/Anonymity, 8 pages.

Wikipedia.org article, "Energy demand management", accessed Aug. 19, 2013, http://en.wikipedia.org/wiki/Energy_demand_management, 6 pages.

Wikipedia.org article, "Green building", accessed Aug. 19, 2013, http://en.wikipedia.org/wiki/Green_building, 1 page.

Wikipedia.org article, "HVAC", accessed Aug. 23, 2013, http://en.wikipedia.org/wiki/HVAC, 1 page.

Wikipedia.org article, "Plug-in hybrid", accessed Aug. 23, 2013, http://en.wikipedia.org/wiki/Plug-in_hybrid, 56 pages.

Wikipedia.org article, "iCalendar", accessed Aug. 23, 2013, http://en.wikipedia.org/wiki/ICalendar, 1 page.

Wikipedia.org article, "Motion detector", accessed Aug. 19, 2013, http://en.wikipedia.org/wiki/Motion_detector, 3 pages.

Goldman et al., "Coordination of Energy Efficiency and Demand Response," Ernest Orlando Lawerence Berkeley National Laboratory, Enviornmental Energy Technologies Division, Jan. 2010, 74 pages.

Simmhan et al. "An Informatics Approach to Demand Response Optimization in Smart Grids," Technical Report Under Preparation, Mar. 3, 2011, 14 pages.

Chinese Office Action 201210320840.7 dated Apr. 25, 2016; 6 pgs.
Chinese Search Report 2012103208407; dated Apr. 25, 2016; 2 pgs.

\* cited by examiner

```xml
<energy_plans>
    <energy_plan time="10:00:00" name="energy use plan to reduce 2% energy use">
        <action location="Meeting room A">
            <item device="lamp A" control="dimming level 60%" />
            <item device="lamp B" control="dimming level 60%" />
            <item device="air conditioner" control="turn up the temp by 2 degrees "/>
        </action>
        <action location="Meeting room B">
            <!-- items go here -->
        </action>
    </energy_plan>
    <energy_plan time="10:01:39" name="energy use plan to reduce 3% energy use">
        <!-- actions go here -->
    </energy_plan>
</energy_plans>
```

Fig. 9

TECHNIQUES FOR SAVING BUILDING ENERGY CONSUMPTION

PRIORITY

The present application claims priority to Chinese application number (CN) 201210320840.7 filed Aug. 31, 2012, and all the benefits accruing therefrom under 35 U.S.C. § 119, the contents of which is incorporated by reference herein in its entirety.

BACKGROUND OF THE INVENTION

The present invention relates generally to energy reducing techniques, and more specifically to energy saving techniques used for reducing energy consumption of a building.

In modern society, buildings provide very important space for business activities. Most business activities happen in the buildings, such as business strategy planning, business negotiation, customer visit, software development, hardware design, etc. Providing a comfortable and inviting environment for occupants of the building is instrumental to improve their working efficiency and productivity, which however, necessarily requires provision of better illumination, air conditioning and ventilation. As a result, more energy is consumed.

Currently, buildings already consume considerable energy. It is estimated that buildings will become the largest consumer of global energy by 2025—more than the transportation and industrial sectors combined. Commercial and residential buildings will consume ⅓ of the worlds energy, wherein up to 50% of the electricity and water that is used by these buildings could be wasted. As a result, power grid load becomes heavier and heavier. Once any failure happens to the power grid, very serious loss will be caused to industrial and commercial fields.

Therefore, reducing the energy consumption of buildings while maintaining the safety and comfort for occupants is a key performance index (KPI) for estate managers; it also is the goal of many ongoing green buildings.

A current way to save energy is to use various sensors to monitor the environment of the building and control devices in the building on demand. For instance occupancy sensors can be used to detect the presence of people, i.e. if there is no people in an area, the illumination in the area will be maintained at a low level, while if people are detected, the illumination level will be increased, or temperature sensors can be used to monitor the environment temperature to control operation of the air conditioner and ventilator. Sensors are good at controlling devices in the field in real time, but they could not provide predictive planning information for building management system in advance.

Another way to save energy is to use an intelligent algorithm to analyze occupants' behavior in the building and thus extract their behavioral patterns. These patterns will be used to control the devices in the field. For example, sensors detect that people come to the office around 8:30 am every day, and a pattern can be extracted as "people are in their office starting at 8:30 am," then the related control strategy could be expressed as "increasing the illumination level at 8:30 am, and turning on the air conditioner/ventilator at 8:15 am (a bit time advance to ensure the air will cool down at 8:30 am)." The advantage of this pattern analysis method is that it can capture the recurring activities in a building, and enable to predict operations of the building management system to some extent. However, such predictive operations are based on rules of thumb, therefore are not very accurate (precise), and cannot capture activities at more detailed levels, e.g., specific use patterns of meeting rooms, etc.

Therefore, a demand side management (DSM) method is proposed. FIG. 2 illustrates a schematic block diagram in which a building management system in the prior art manages electrical devices in a building based on a DSM request message from a smart grid. The demand side management is one of important technologies of the current smart grid. The basic idea of the demand side management is that the power grid can send a DSM signal to electrical devices connected thereto in the peak hour to inform them to lower load, and the electrical devices, upon receipt of the signal, should respond to the signal (i.e., lower the load), otherwise much higher fees will be charged for the amount of electricity consumed by these devices during the peak hour. Another possible situation is that if these devices do not respond to the DSM signal to lower the load, the power grid may become too overloaded and break down, which will cause very serious losses to business and industrial enterprises.

In the prior art of applying the DSM to the building management, the devices in the power grid respond to the DSM signal in an ad hoc manner, and thus it may not guarantee a total effect of the DSM, for example, the reduction of load might not meet a desired requirement so that the estate manager has to pay more electricity fees. Another possible way is centralized building management, wherein the building management system may uniformly reduce the load of all devices upon receipt of the DSM request. However, this way does not take differences between various business activities in consideration so that it cannot ensure quality of service for some important business activities. This might exert a negative influence on these business activities and cause irreparable losses.

SUMMARY

According to one aspect of the present invention, a method and system for reducing building energy consumption is provided. The method is provided for saving building energy consumption by obtaining at least one energy use strategy in association with a current or future activity in a building. The method includes aggregating activity data from at least one system associated with the current or future activity and estimating an energy demand level based at least on the aggregated activity data. The method also includes generating at least one energy use strategy based at least on the estimated energy demand.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 9 illustrates an example of an energy use strategy script generated by an energy use strategy generating module in accordance to an embodiment;

DETAILED DESCRIPTION

Figure 1:
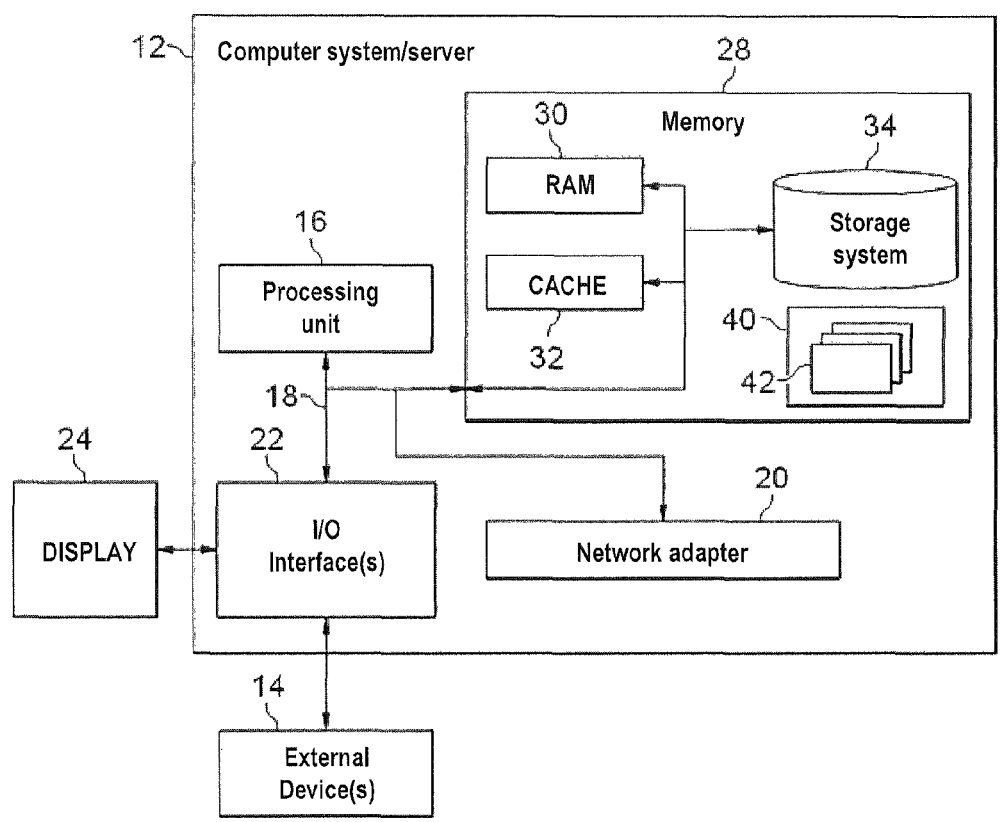
FIG. 1 illustrates a block diagram of an exemplary computer system/server 12 which is applicable to implement the embodiments of the present invention.
Figure 2:
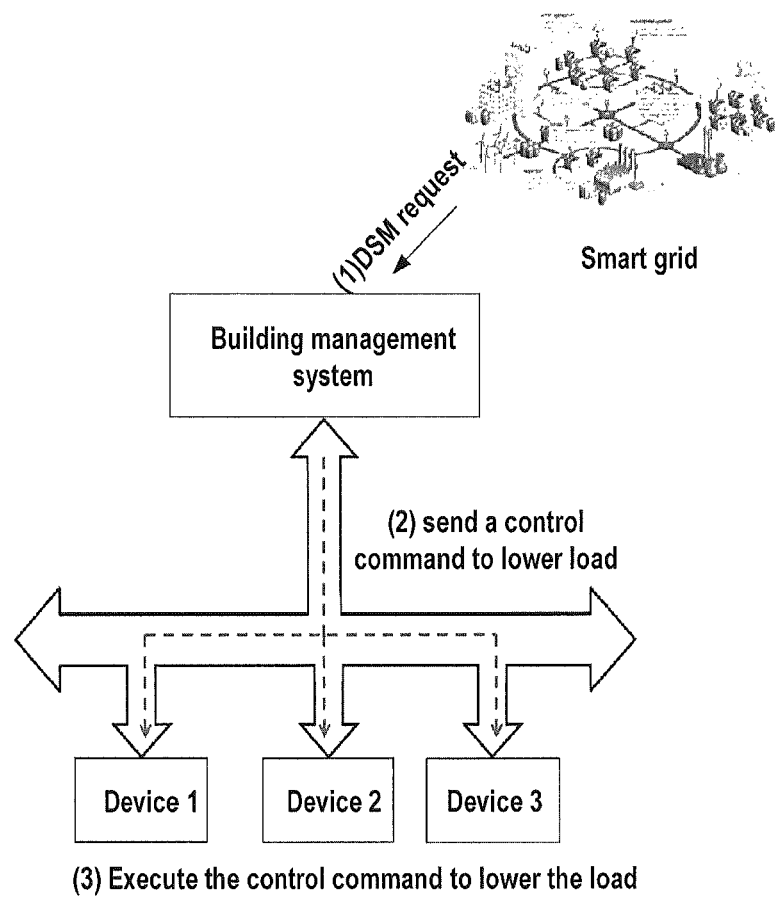
FIG. 2 illustrates a schematic block diagram in which a building management system manages electrical devices in a building based on a DSM request message from a smart grid.

Some embodiments will be described in more detail with reference to the accompanying drawings. However, as appreciated by those skilled in the art, alternate implementations can be provided in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In one embodiment of the present invention, there is provided a method for saving building energy consumption. By this method, business activity data obtained from one or more data systems such as collaboration software is aggregated into a building management system so that the building management system is aware of what activity will happen at a certain time and a certain place in the future so as to predict energy use in the building, identify a crisis time point of energy use during the operating of the building, generate energy use strategies in advance by correspondingly considering differences between various business activities, and execute the strategy in practical operations when the DSM signal is valid. This method may provide accurate predictive energy use strategies and pre-adjustment of the devices so as to save the building energy consumption and meanwhile ensure the quality of service for various business activities.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for performing operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry standard architecture (ISA) bus, micro channel architecture (MCA) bus, enhanced ISA (EISA) bus, video electronics standards association (VESA) local bus, and peripheral component interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to perform the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
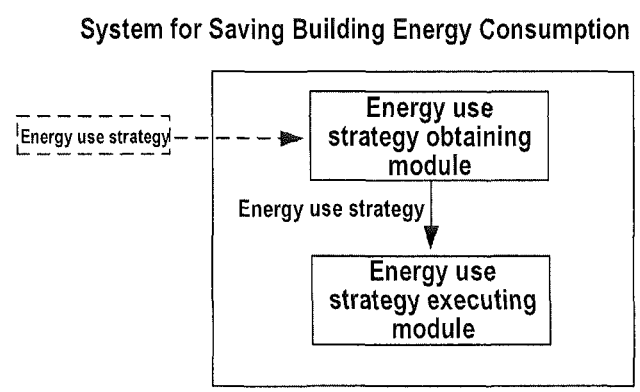
FIG. 3 illustrates a schematic block diagram of a system for saving building energy consumption in accordance to an embodiment.

With reference now to FIG. 3, FIG. 3 illustrates a schematic block diagram of a system for saving building energy consumption according to one embodiment of the present invention. The system as shown in FIG. 3 comprises: an energy use strategy obtaining module configured to obtain a plurality of energy use strategies related to current or future activities in a building and able to meet load requirements of a power grid, wherein the energy use strategy obtaining module may receive the plurality of energy use strategies from the outside of the building system or generate the plurality of energy use strategies within the building system; and an energy use strategy executing module configured to execute the generated energy use strategies on devices to be adjusted in the building.

Figure 4:
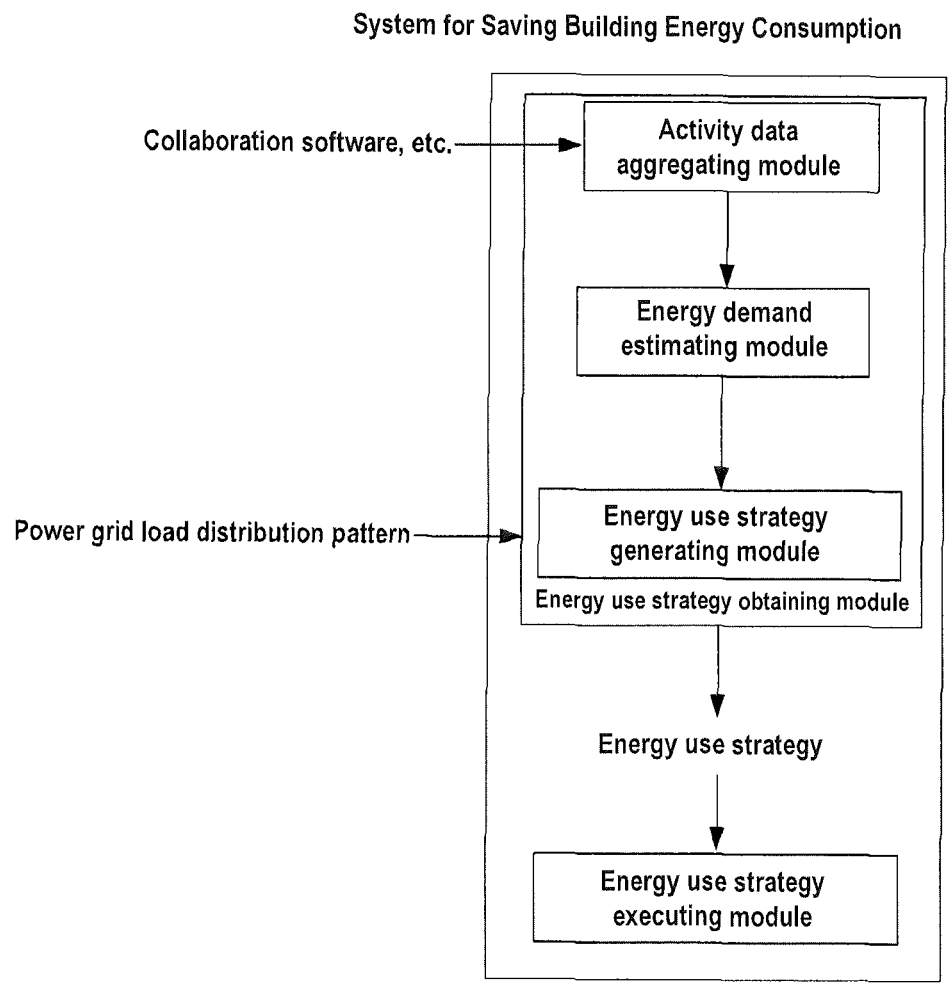
FIG. 4 illustrates a schematic block diagram of a system for saving building energy consumption in accordance to an alternate embodiment.

FIG. 4 illustrates a system for saving building energy consumption according to another embodiment of the present invention. The embodiment describes a situation in which the plurality of energy use strategies is generated within the energy use strategy obtaining module. In this embodiment, the energy use strategy obtaining module further comprises: an activity data aggregating module configured to aggregate activity data from one or more systems external to the system for saving building energy consumption, wherein the one or more systems may for example comprise collaboration software systems, intra-enterprise conferencing systems or artificial input systems, and may come from a plurality of different enterprises; an energy demand estimating module configured to analyze the aggregated activity data and estimate an energy demand according to the aggregated activity data; an energy use strategy generating module configured to formulate and generate a plurality of energy use strategies meeting requirements of current or future activities in the building and load requirements of the power grid.

According to one embodiment of the present invention, the collaboration software may for example use iCalendar to represent a variety of current or future activities, but the present invention is not limited to the iCalendar. iCalendar is a "calendar data exchange" standard (RFC 2445). iCalendar permits a user to send a "conference request" or "task" via E-mail or by file sharing. A recipient may easily respond to a sender via a mail client supporting iCalendar, i.e., receive the request or propose another new conference time. iCalendar data are generally exchanged via E-mails, but they may be used independently, not limited to a certain transport protocol. iCalendar has already been supported by many products, such as IBM Lotus Notes, Google Calendar and Yahoo! Calendar, and Microsoft Outlook and Novell GroupWise also partially supports iCalendar.

These collaborative softwares may provide an accurate data source for business activities in the building, for example, provide information about what someone will do at a certain time and certain place. Collaborative software is a kind of enterprise software, and the system for saving energy consumption of a building might be owned and operated by an outsourced third party facility management company. Therefore in most cases, the two systems are isolated and a strict access control protocol is executed for data transfer between them.

Although the system for saving building energy consumption described in the preceding text relates to a plurality of modules, dividing one module into a plurality of modules or combining the plurality of modules into one module falls within the protection scope of the present invention so long as it can still perform corresponding functions.

Detailed description will be presented in the following with respect to the operations of respective parts of the system for saving building energy consumption which internally generates the energy use strategies with reference to figures.

Figure 5:
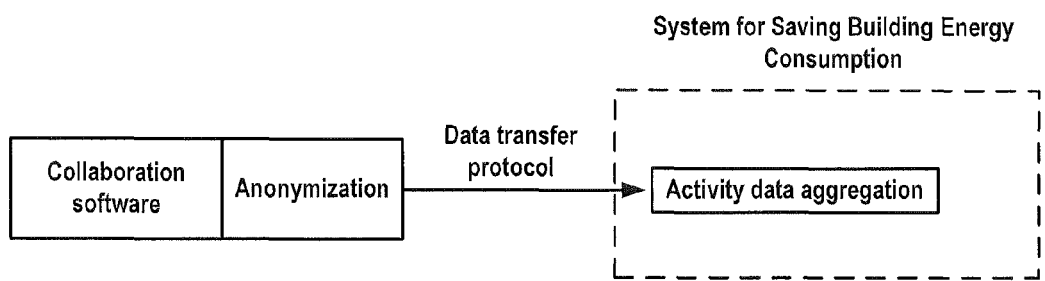
FIG. 5 illustrates one example of transmitting data from a collaboration software to a system for saving building energy consumption in accordance to an embodiment.

Activity data aggregation—Activity data aggregation is usually performed depending on the activity data provided by a plurality of data systems (such as collaboration software or via manual input of a manual system) outside of a building management system. The activity data aggregating module may for example, via E-mail, file sharing or web service protocol (e.g., SOAP/HTTP), receive from the external data sources activity data related to current or future activities in the building. FIG. 5 illustrates one example of transmitting data from a collaboration software to a building management system.

In the case that the data provided by the external data systems has different formats, the activity data aggregating module may convert the received data in various different formats into a uniform standard (such as, iCalendar) for processing. Since business activity data might involve some sensitive contents, according to one embodiment of the present invention, before the activity data are transmitted to the activity data aggregating module of the building management system, an "anonymizing" operation is performed to remove business sensitive information and only retain some information necessary for performing energy demand estimation. For example, an "anonymizing" method is to only retain the number of attendants of the current or future activities, activity categories (such as business discussion, celebration activities or project meeting etc.) and activity duration. The category information can be obtained for example by analyzing the collaboration software, such as the "summary" and "categories" items in a calendar. The activity categories may further provide some information about priorities of the activities.

After the activity data aggregating module obtains the activity data, aggregation operations may be performed for all activity data based on time and place to produce the aggregated activity data so as to enable the building management system (i.e., the system for saving building energy consumption) to learn about, from the aggregated activity data, what event will happen at a certain time in the future and at a certain place in the building. A mode for aggregating data may be, for example, listing activities happening at different times and places with a table, e.g., Table 1 shows one example of aggregating the activity data with a table, wherein each column represents activities happening at a certain place and different times, and each row represents activities happening at a certain period of time and different places.

TABLE 1

| Time | Place | | | |
| --- | --- | --- | --- | --- |
| | Meeting Room A | Meeting Room C | Lobby | Office B |
| 9:00-10:00 | Project Meeting | Project Meeting | Celebration Activity | Routine Work |
| 10:00-11:00 | | | | |
| 11:00-12:00 | | Project Meeting | | |
| 12:00-13:00 | | | | Routine Work |

Figure 6:
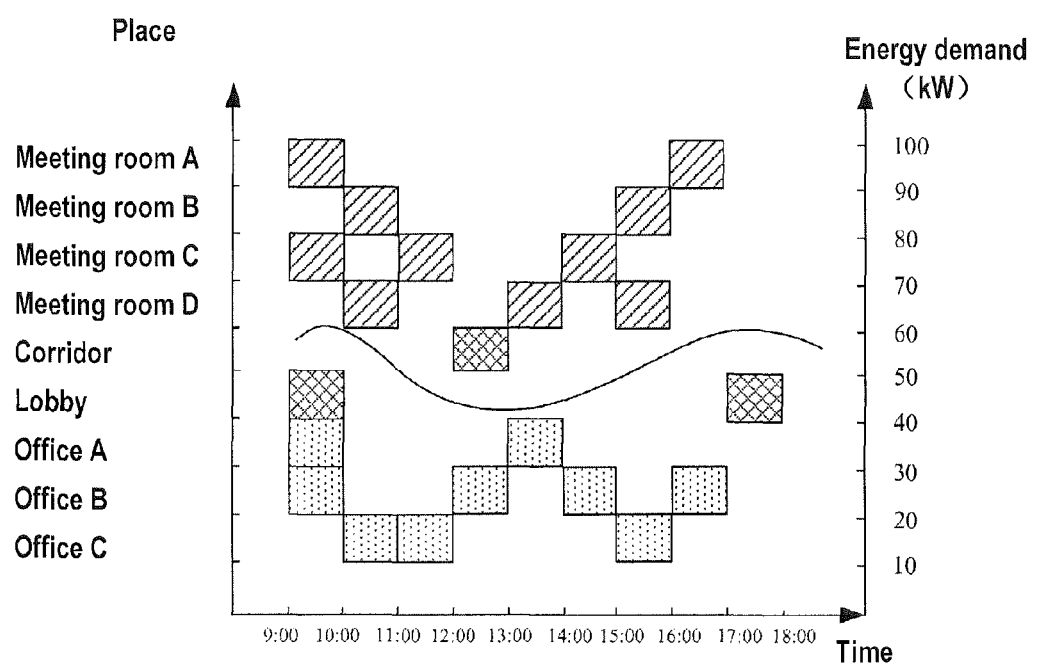
FIG. 6 illustrates an example of aggregated activity data based on time and place and an example of an estimated energy use demand in accordance to an embodiment.

The contents in respective items as listed in the above table may be represented in the manner of legends. In FIG. 6, the aggregated activity data of various activities in the building based on time and place are represented in the manner of legends. As shown in FIG. 6, different filled patterns represent different activity categories, for example, ▨ represents project meeting, ▩ represents celebration activity, and ▢ represents routine work.

Energy demand estimation—After obtaining the aggregated activity data, the energy demand estimating module may analyze the aggregated activity data and estimate energy demands during different time periods.

There are many factors affecting the energy demand estimation, including, for example, activity categories, the number of attendants and duration of an activity etc. Specifically speaking, different activities have different energy demands, for example, celebration activities might require particular lighting effects to create the desired atmosphere and impose a higher energy demand; an ordinary meeting may only need regular illumination; a presentation or lecture may only need lower illumination to enable a projector to achieve an optimal effect and therefore requires a lower energy demand. Besides, the number of attendants also has influence on the use of the air conditioner, for example, if there are only few people in a room, only weak air conditioning is needed. The duration of an activity is obviously associated with the energy demand, for example, longer duration of the activity means more energy consumption. Therefore, upon energy demand estimation, nature of activities needs to be taken into account to determine possible energy consumption of related devices.

According to one or more embodiments, the system for saving building energy consumption knows exact locations of all electrical devices in the building and their rated power consumption. Therefore, according to one embodiment of the present invention, the energy demand estimation during a certain time period may be performed by adding together the energy consumed by electrical devices related to certain activities during the time period. For example, the energy possibly consumed by the lighting, heating, ventilation and air conditioning (HVAC), projectors and computers used for activities from 10:00 am-11:00 am may be added together to compute the energy demand for these activities during this time period. Alternatively, the estimation may be performed by virtue of historical experience, e.g., according to the energy consumed by similar activities conducted previously.

The curve varying with time in FIG. 6 shows the energy demand estimated based on the aggregated activity data according to embodiments of the present invention.

Energy use strategy generation—The energy use strategy generating module generates a plurality of energy use strategies for building management according to the estimated energy demand and the power grid load distribution pattern. These energy use strategies vary with time.

Figure 7:
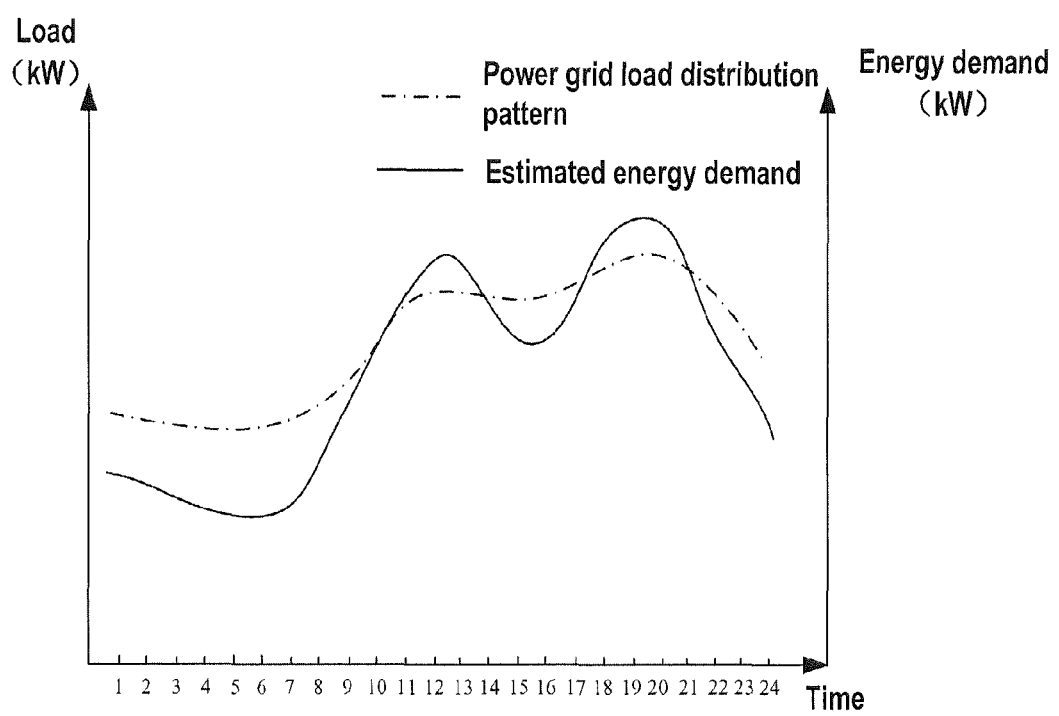
FIG. 7 illustrates an example of curves of a power grid load distribution pattern and the estimated energy demand in accordance to an embodiment.

FIG. 7 illustrates curves of a power grid load distribution pattern and the estimated energy demand. The curve of the power grid load distribution pattern shows fluctuation of the load in the power grid along with time change in a day, for example, in the daytime, the power grid has a heavier load whilst at night the power grid has a lighter load. The power grid load distribution pattern is a normal load pattern of the building and it may be obtained for example from the previous historical load data of the power grid.

The power grid load distribution pattern is compared with the estimated energy demand. If the estimated energy demand exceeds the normal load during a certain time period, some preventive measures should be taken in advance. For instance, if the estimated energy demand in the time period 10:00 am-10:10 am is RkW higher than the normal power grid load, the energy use strategy generating module may generate the following energy use strategy for this time period: at the beginning time 10:00, the brightness of light A and light B in meeting room A is lowered by 60% and the temperature of the air conditioning is raised by 2 degrees; light A in meeting room B is turned off and the temperature of the air conditioning is raised by 2 degrees so that the energy use load in the building is lowered at least by RkW.

Figure 8:
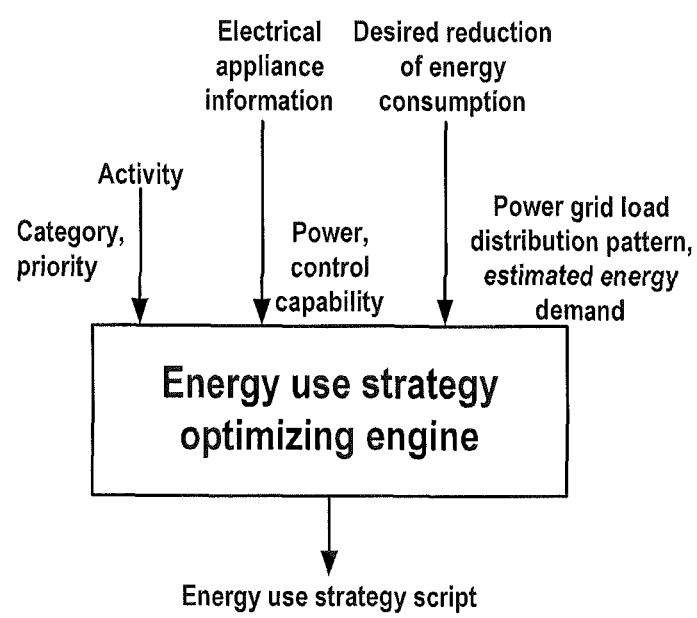
FIG. 8 illustrates an energy use strategy optimization engine for generating energy use strategies in accordance to an embodiment.

According to one embodiment of the present invention, the energy use strategy generating module comprises an energy use strategy optimizing engine for generating energy use strategies, as shown in FIG. 8. During the generation of the energy use strategies, devices with fixed energy consumption, such as a data center, HVAC in the data center and communication networks, may be excluded, and only energy consumption of the electrical devices associated with the anticipated activities are taken into account. As shown in FIG. 8, the input of the optimizing engine is activity information (such as activity categories and their priorities), electrical device information (such as rated power consumption and control capabilities of related devices (e.g., the light may be dimmed or the air conditioning is adjustable)) and a desired reduction of total energy consumption. The output of the optimizing engine is energy use strategy scripts. FIG. 9 illustrates an example of an energy use strategy script generated by the energy use strategy generating module according to embodiments of the present invention. The generated energy use strategy may be stored in a local or remote memory or database.

The energy use strategy optimizing engine takes activity priorities into consideration so that the energy demand of an activity with a high priority can be ensured as much as possible. For example, if a current or future activity is an important business negotiation and the activity has a higher priority, the quality of service for the activity will be ensured preferentially. Therefore, even though the load of the building exceeds a predetermined standard, the devices related to the activity are adjusted as less as possible. In addition, the activity categories are also taken into account, for example, if the activity is a lecture, the demand for lighting is not much high, so the light may be dimmed to lower the load. The energy use strategy optimizing engine determines a desired reduction of energy consumption at corresponding time by comparing the power grid load distribution pattern and the estimated energy demand as shown in FIG. 7.

Figure 10:
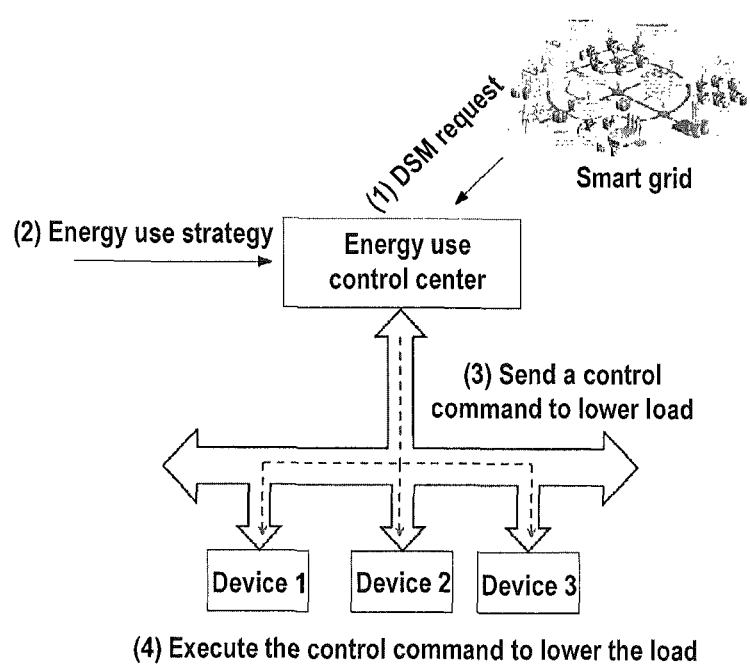
FIG. 10 illustrates a centralized energy use strategy executing scheme in accordance to an embodiment.
Figure 11:
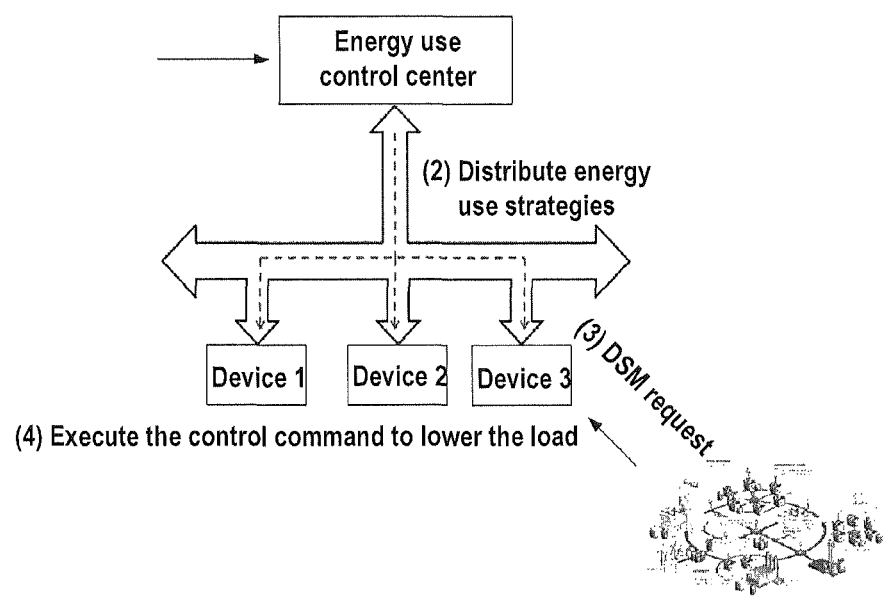
FIG. 11 illustrates a distributed energy use strategy executing scheme in accordance to an embodiment.

Energy use strategy execution—FIG. 10 and FIG. 11 respectively illustrate a centralized energy use strategy executing manner and a distributed energy use strategy executing manner according to embodiments of the present invention. The energy use strategy executing module as stated above is implemented as an energy use control center in FIGS. 10 and 11, which executes the corresponding energy use strategy in response to the DSM request from the power grid and according to the energy use strategies generated by the energy use obtaining module or obtained from the outside.

In the embodiment of the centralized executing manner as shown in FIG. 10, when the energy use in the building exceeds the load and the DSM request signal for lowering the load is received from the power grid, the energy use control center selects from the obtained plurality of energy use strategies an energy use strategy for use at that time point. According to the selected energy use strategy, the energy use control center for example judges which devices need to be adjusted, the amount of adjustment, the time for starting or ending an adjustment or the like, then generates a control command for lowering the load with respect to these devices to be adjusted. The control command may comprise, for example, a desired amount of adjustment, the time for starting and ending an adjustment, etc. Then the energy use control center transmits the control command to corresponding devices to be adjusted in the building via a network (for example, via a network cable or electrical power line). After receiving the control command, the devices to be adjusted perform the adjustment to lower the load. Alternatively, after the devices to be adjusted perform the control command for lowering the load, they may feed back a response which indicates that adjustment is already executed to the energy use control center. Alternatively, the response may also comprise adjustment information about the adjusted devices, for example, device 1 may include in the response thereof information such as "brightness level lowered by 60%."

In the embodiment of the distributed executing manner as shown in FIG. 11, assume the adjustable devices in the building connected to the power grid all can receive the DSM signal from the power grid and have a local memory, a processor and an adjusting component, the energy use control center in the building management system may obtain in advance planned energy use strategies from the database or memory in which the energy use strategies are already stored or directly obtain the planned energy use strategies from the energy use strategy generating module, and distribute via a network (for example, via a network cable or electrical power line) these energy use strategies to the adjustable devices in the building, and these adjustable devices store these energy use strategies in their local memories. When these adjustable devices receive the DSM request from the power grid, the processors in these devices may search and select the energy use strategy (strategies) for use at that time point and judge whether to adjust the devices to which they belong. If the devices need to be adjusted, the control command can be internally generated to lower the load, and the adjusting component is instructed to execute the control command to lower the load.

Figure 12:
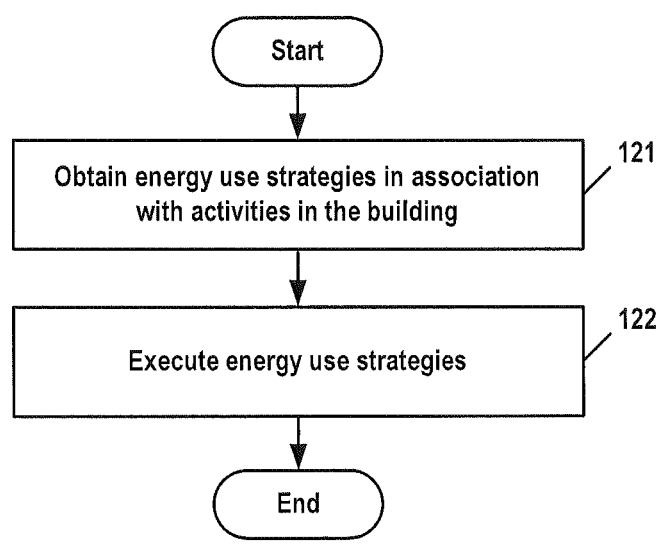
FIG. 12 illustrates a flow chart of an energy saving scheme related to a building's energy consumption in accordance to an embodiment.

FIG. 12 illustrates a flow chart of a method for saving building energy consumption according to one embodiment of the present invention. As shown in FIG. 12, in block 121, the energy use strategy associated with the activities in the building is obtained, then, in block 122, the energy use strategy is executed with respect to the devices to be adjusted in the building in response to the DSM request signal, so as to lower the load of the building to meet the normal power grid load requirement.

Figure 13:
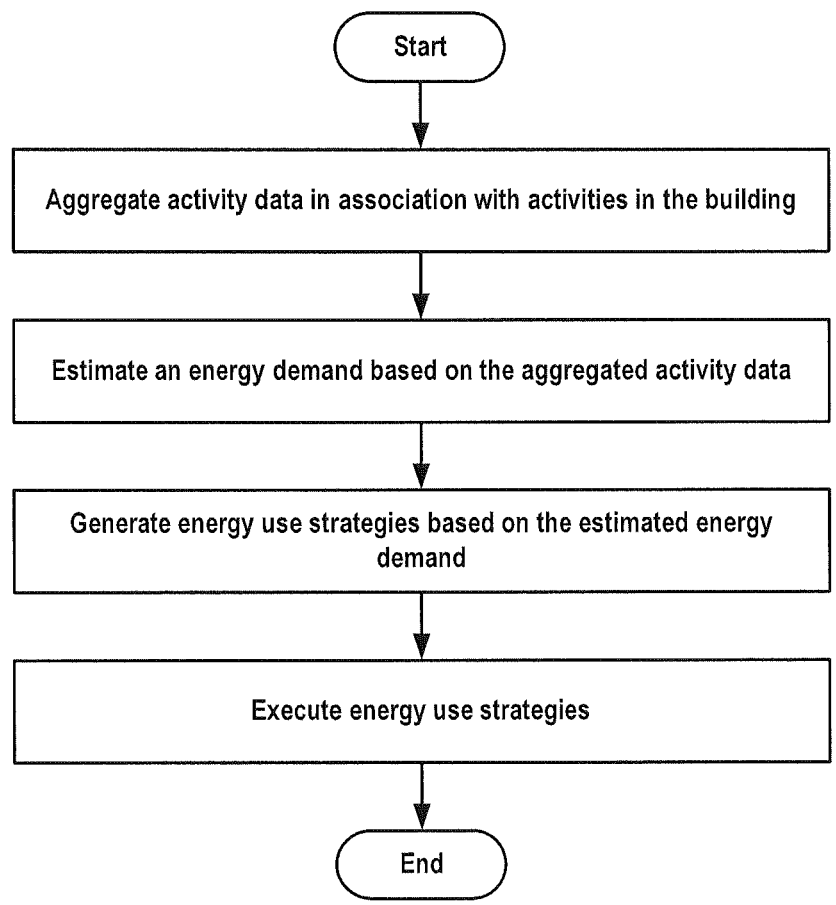
FIG. 13 illustrates a flow chart of an energy saving scheme related to a building's energy consumption according to an alternate embodiment.

FIG. 13 illustrates a flow chart of a method for saving building energy consumption according to another embodiment of the present invention. As shown in FIG. 13, first in block 131, activity data coming from one or more external systems and being associated with the activities in the building are aggregated; then in block 132, the energy demand is estimated based on the aggregated activity data; then in block 133, one or more energy use strategies are generated according to the estimated energy demand; finally, in block 134, the energy use strategy is executed with respect to the devices to be adjusted in the building in response to the DSM request signal, so as to lower the load of the building to meet the normal power grid load requirement.

The system for saving building energy consumption according to embodiments of the present invention may be totally or partially integrated into a social collaboration software, such as Calendar, Lotus Notes, Communicator and Messenger, etc., wherein information about energy use demand may also be used for other optimizing and predicting functions, for example, the information may be used to assist an estate manager to identify a dangerous time period of energy use in the building to facilitate safety management of the use of the building. The system for saving building energy consumption according to embodiments of the present invention can ensure the quality of service for business activities in the building while lowering the energy costs required for running the whole building. The method for saving building energy consumption according to embodiments of the present invention enables performing precise and predictive energy use planning so as to coordinate adjustment of the related devices in the building while considering the nature and status of business activities when the demand side management request is received from the power grid.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for saving building energy consumption by obtaining at least one energy use strategy in association with a current or future activity in a building, comprising:
aggregating activity data from at least one system associated with said current or future activity, wherein said activity data is anonymized before being aggregated, wherein said one or more systems comprise a collaboration software system, the anonymizing retains information including a number of attendants, activity categories information, and activity duration information;
estimating an energy demand level based at least on said aggregated activity data; and
generating at least one energy use strategy based at least on the estimated energy demand, the at least one energy use strategy is based on the priority of said activity, wherein the at least one energy use strategy excludes considering devices having a fixed energy consumption, wherein executing the at least one energy use strategy is in response to a demand side management request such that said devices can be adjusted continually, further comprising:
upon receiving said demand side management request, selecting from said plurality of energy use strategies, at least one energy use strategy suitable for a particular selected time line;
determining at least one device to be adjusted in said building;
generating a control command for lowering at least one load related to said device to be adjusted;
sending said control command to said device to be adjusted;
adjusting said device correspondingly; and
receiving feedback in response to said demand side management request, wherein the feedback includes information associated with adjusted devices.

2. The method according to claim 1, wherein a plurality of energy use strategies are available further comprising executing said energy use strategy for a plurality of devices in said building.

3. The method according to claim 1, wherein executing said energy use strategy further comprises:
sending in advance at least one energy use strategies to at least one device to be adjusted in association with said current or future activity in said building.

4. The method according to claim 1, wherein the estimating an energy demand based at least on said aggregated activity data further comprises:
estimating the energy demand at a certain time by adding together energy consumption of one or more devices to be adjusted related to said current or future activity at that certain time, wherein said adjustment is also determined at least based on a power rating associated with said device.

5. The method according to claim 4, wherein said of adjusted is at least based on a device categories, device use duration and number of persons attending said device.

6. The method according to claim 1, wherein the aggregating activity data coming further comprises: representing in the form of a table a plurality of current or future activities happening at a certain place and at different times or at different places.

7. The method according to claim 1, wherein the generating said energy is based at least on a category selected from the group consisting of rated power consumption, control capabilities of a plurality of devices, and a desired total amount of desired device adjustment.

8. The method according to claim 7, wherein the desired total amount of adjustment is obtained by comparing the estimated energy demand and a power grid load distribution pattern and said power grid load distribution pattern is obtained based on historical data of power grid load.

9. An apparatus for saving building energy consumption, comprising:
- a module having a processor configured for generating an energy use strategy in association with a current or future activity in a building;
- an energy use strategy executing module configured to execute said one or more energy use strategies for a plurality of devices to be adjusted in said building in response to a demand side management request;
- said energy use strategy obtaining module further comprising:
  - an activity data aggregating module configured to aggregate activity data from at least one system associated with said current or future activities, wherein said activity data is anonymized before being aggregated, wherein said one or more systems comprise a collaboration software system, the anonymizing retains information including a number of attendants, activity categories information, and activity duration information;
  - an energy demand estimating module configured to estimate an energy demand based on said aggregated activity data; and
  - an energy use strategy generating module configured to generate said energy use strategy based on said estimated energy demand, wherein the at least one energy use strategy excludes considering devices having a fixed energy consumption, wherein said energy use strategy executing module is further configured to:
    - upon receiving said management request is received, select from said one or more energy use strategies an energy use strategy suitable for a particular time;
    - determine a device to be adjusted in said building;
    - generate a control command for lowering a load with respect to said determined device to be adjusted;
    - send said control command to said devices to be adjusted;
    - adjust said device correspondingly; and
    - receive feedback in response to said demand side management request, wherein the feedback includes information associated with adjusted devices.

10. The apparatus according to claim 9, wherein the energy use strategy executing module is further configured to:
- sending in advance said one or more energy use strategies to one or more devices to be adjusted in association with said one or more current or future activities in the building;
- estimating energy demand at a certain time by adding together energy consumption of one or more devices to be adjusted.

11. The apparatus according to claim 10, wherein said energy consumption estimate in said building at a certain time is determined based power rating of at least one device associated with a current or future activity.

12. The apparatus according to claim 9, wherein the activity data aggregating module is further configured to aggregate activity data coming from one or more systems and associated with said current or future activities.

13. The apparatus according to claim 9, a desired total amount of adjustment is obtained by comparing the estimated energy demand and a power grid load distribution pattern.

14. The apparatus according to claim 13, wherein said power grid load distribution pattern is obtained based on historical data of a power grid load.

* * * * *